United States Patent
Matsuoka

(10) Patent No.: US 8,711,254 B2
(45) Date of Patent: Apr. 29, 2014

(54) IMAGE PROCESSING APPARATUS AND METHOD HAVING DEFECTIVE PIXEL DETECTION AND CORRECTION ABILITY

(75) Inventor: Masaaki Matsuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 323 days.

(21) Appl. No.: 12/971,598

(22) Filed: Dec. 17, 2010

(65) Prior Publication Data

US 2011/0149123 A1 Jun. 23, 2011

(30) Foreign Application Priority Data

Dec. 22, 2009 (JP) ................................ 2009-291402

(51) Int. Cl.
*H04N 5/262* (2006.01)

(52) U.S. Cl.
USPC ........................................ 348/247; 348/222.1

(58) Field of Classification Search
USPC ...................................... 348/222.1, 246, 247
See application file for complete search history.

(56) References Cited

U.S. PATENT DOCUMENTS

| 7,657,116 B2 | 2/2010 | Matsuoka et al. | |
| 2005/0078204 A1* | 4/2005 | Matsuoka et al. | 348/247 |
| 2009/0167907 A1* | 7/2009 | Utsugi | 348/246 |
| 2010/0073526 A1* | 3/2010 | Watanabe et al. | 348/247 |
| 2011/0080505 A1* | 4/2011 | Ogino | 348/246 |

FOREIGN PATENT DOCUMENTS

| JP | 2003-259221 | 9/2003 |
| JP | 2005-136970 | 5/2005 |
| JP | 2008-053886 | 3/2008 |

* cited by examiner

*Primary Examiner* — Gevell Selby
(74) *Attorney, Agent, or Firm* — Cowan, Liebowitz & Latman, P.C.

(57) ABSTRACT

An image processing apparatus comprises: a storage unit storing a first group of defective pixel data including positional information on a defective pixel of an image sensor and information on a type of defect; a detection unit which detects a defective pixel of the image sensor and generates a second group of defective pixel data; a combining unit which combines the first and second groups to generate a third group; and a correction unit which corrects an image signal output from a defective pixel of the image sensor using the third group, wherein the combining unit assigns a priority level corresponding to the type of defect to each piece of defective pixel data, and if there are multiple pieces of defective pixel data including common positional information, leaves the defective pixel data in the order of priority level, the highest the first and the lowest the last.

9 Claims, 11 Drawing Sheets

F I G. 2

MEMORY ADDRESS

| 0x0000 | POS = A | ID = (SHUTTER SPEED) | GR = (2 SECONDS) |
|---|---|---|---|
| 0x0001 | POS = PREV | ID = (TEMPERATURE) | GR = (40 °C) |
| 0x0002 | POS = PREV | ID = (NONSTEADY) | GR = (2 / 10 TIMES) |
| 0x0003 | POS = D | ID = (SHUTTER SPEED) | GR = (1 / 3 SECONDS) |

FACTORY DEFECTIVE PIXEL DATA

MEMORY ADDRESS

| | | | |
|---|---|---|---|
| 0x0000 | POS = A | ID = (SHUTTER SPEED) | GR = (2 SECONDS) |
| 0x0001 | POS = PREV | ID = (TEMPERATURE) | GR = (40 °C) |
| 0x0002 | POS = B | ID = (NONSTEADY) | GR = (3 / 10 TIMES) |
| 0x0003 | POS = C | ID = (SHUTTER SPEED) | GR = (1 / 5 SECONDS) |

FIG. 3B

POST-DETECTED DEFECTIVE PIXEL DATA

DETECTION ORDER

| | | | |
|---|---|---|---|
| 1 | POS = A | ID = (NONSTEADY) | GR = (2 / 10 TIMES) |
| 2 | POS = D | ID = (SHUTTER SPEED) | GR = (1 / 3 SECONDS) |
| 3 | POS = E | ID = (SHUTTER SPEED) | GR = (1 SECOND) |

FIG. 3C

MERGED DEFECTIVE PIXEL DATA

MEMORY ADDRESS

| | | | |
|---|---|---|---|
| 0x0000 | POS = A | ID = (SHUTTER SPEED) | GR = (2 SECONDS) |
| 0x0001 | POS = PREV | ID = (TEMPERATURE) | GR = (40 °C) |
| 0x0002 | POS = B | ID = (NONSTEADY) | GR = (3 / 10 TIMES) |
| 0x0003 | POS = C | ID = (SHUTTER SPEED) | GR = (1 / 5 SECONDS) |
| 0x0004 | POS = D | ID = (SHUTTER SPEED) | GR = (1 / 3 SECONDS) |
| 0x0005 | POS = E | ID = (SHUTTER SPEED) | GR = (1 SECOND) |

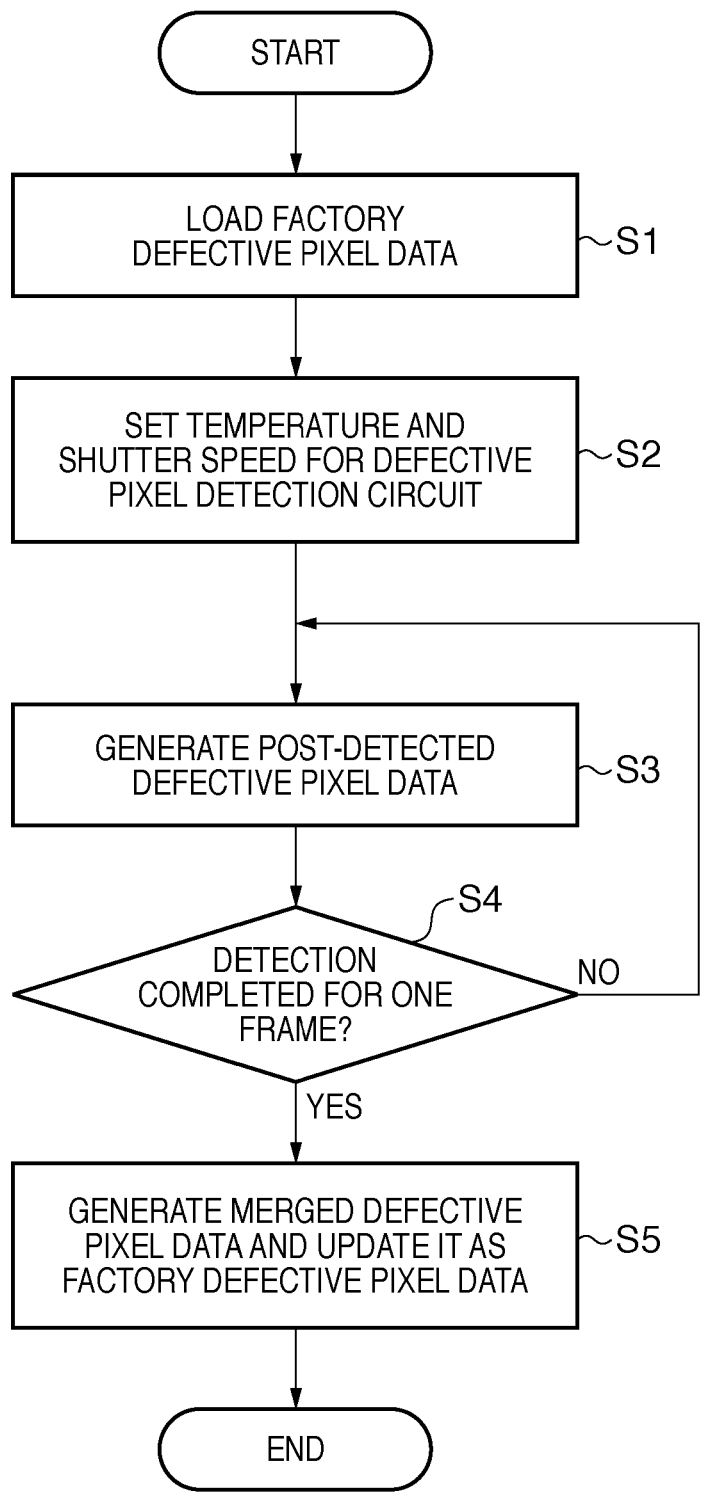

FIG. 6A

FACTORY DEFECTIVE PIXEL DATA

MEMORY ADDRESS

| 0x0000 | POS = A | ID = (SHUTTER SPEED) | GR = (2 SECONDS) |
|---|---|---|---|
| 0x0001 | POS = PREV | ID = (TEMPERATURE) | GR = (40 °C) |
| 0x0002 | POS = B | ID = (NONSTEADY) | GR = (3 / 10 TIMES) |
| 0x0003 | POS = C | ID = (SHUTTER SPEED) | GR = (1 / 5 SECONDS) |

FIG. 6B

POST-DETECTED DEFECTIVE PIXEL DATA

DETECTION ORDER

| 1 | POS = A | ID = (NONSTEADY) | GR = (2 / 10 TIMES) |
|---|---|---|---|
| 2 | POS = D | ID = (SHUTTER SPEED) | GR = (1 / 3 SECONDS) |
| 3 | POS = E | ID = (SHUTTER SPEED) | GR = (1 SECOND) |

FIG. 6C

MERGED DEFECTIVE PIXEL DATA

MEMORY ADDRESS

| 0x0000 | POS = A | ID = (TEMPERATURE) | GR = (40 °C) |
|---|---|---|---|
| 0x0001 | POS = PREV | ID = (NONSTEADY) | GR = (2 / 10 TIMES) |
| 0x0002 | POS = B | ID = (NONSTEADY) | GR = (3 / 10 TIMES) |
| 0x0003 | POS = C | ID = (SHUTTER SPEED) | GR = (1 / 5 SECONDS) |
| 0x0004 | POS = D | ID = (SHUTTER SPEED) | GR = (1 / 3 SECONDS) |
| 0x0005 | POS = E | ID = (SHUTTER SPEED) | GR = (1 SECOND) |

FIG. 7A

FACTORY DEFECTIVE PIXEL DATA

MEMORY ADDRESS

| | | | |
|---|---|---|---|
| 0x0000 | POS = A | ID = (SHUTTER SPEED) | GR = (2 SECONDS) |
| 0x0001 | POS = PREV | ID = (TEMPERATURE) | GR = (40 °C) |
| 0x0002 | POS = PREV | ID = (NONSTEADY) | GR = (2 / 10 TIMES) |
| 0x0003 | POS = B | ID = (NONSTEADY) | GR = (3 / 10 TIMES) |
| 0x0004 | POS = C | ID = (SHUTTER SPEED) | GR = (1 / 5 SECONDS) |

FIG. 7B

POST-DETECTED DEFECTIVE PIXEL DATA

DETECTION ORDER

| | | | |
|---|---|---|---|
| 1 | POS = A | ID = (SHUTTER SPEED) | GR = (1 SECOND) |

FIG. 7C

MERGED DEFECTIVE PIXEL DATA

MEMORY ADDRESS

| | | | |
|---|---|---|---|
| 0x0000 | POS = A | ID = (TEMPERATURE) | GR = (40 °C) |
| 0x0001 | POS = PREV | ID = (SHUTTER SPEED) | GR = (1 SECOND) |
| 0x0002 | POS = PREV | ID = (NONSTEADY) | GR = (2 / 10 TIMES) |
| 0x0003 | POS = C | ID = (NONSTEADY) | GR = (3 / 10 TIMES) |
| 0x0004 | POS = D | ID = (SHUTTER SPEED) | GR = (1 / 5 SECONDS) |

FIG. 8A

FACTORY DEFECTIVE PIXEL DATA

MEMORY ADDRESS

| 0x0000 | POS = A | ID = (TEMPERATURE) | GR = (40 °C) |
|---|---|---|---|
| 0x0001 | POS = PREV | ID = (SHUTTER SPEED) | GR = (1 SECOND) |
| 0x0002 | POS = PREV | ID = (NONSTEADY) | GR = (2 / 10 TIMES) |
| 0x0003 | POS = B | ID = (NONSTEADY) | GR = (3 / 10 TIMES) |
| 0x0004 | POS = C | ID = (SHUTTER SPEED) | GR = (1 / 5 SECONDS) |

FIG. 8B

POST-DETECTED DEFECTIVE PIXEL DATA

DETECTION ORDER

| 1 | POS = A | ID = (CONTINUOUS) | GR = (2 CONTINUOUS PIXELS) |
|---|---|---|---|

FIG. 8C

MERGED DEFECTIVE PIXEL DATA

MEMORY ADDRESS

| 0x0000 | POS = A | ID = (SHUTTER SPEED) | GR = (1 SECONDS) |
|---|---|---|---|
| 0x0001 | POS = PREV | ID = (NONSTEADY) | GR = (2 / 10 TIMES) |
| 0x0002 | POS = PREV | ID = (CONTINUOUS) | GR = (2 CONTINUOUS PIXELS) |
| 0x0003 | POS = C | ID = (NONSTEADY) | GR = (3 / 10 TIMES) |
| 0x0004 | POS = D | ID = (SHUTTER SPEED) | GR = (1 / 5 SECONDS) |

FIG. 9A

FACTORY DEFECTIVE PIXEL DATA

MEMORY ADDRESS

| 0x0000 | POS = A | ID = (SHUTTER SPEED) | GR = (2 SECONDS) |
|---|---|---|---|
| 0x0001 | POS = PREV | ID = (TEMPERATURE) | GR = (40 °C) |
| 0x0002 | POS = B | ID = (NONSTEADY) | GR = (3 / 10 TIMES) |
| 0x0003 | POS = C | ID = (SHUTTER SPEED) | GR = (1 / 5 SECONDS) |

FIG. 9B

POST-DETECTED DEFECTIVE PIXEL DATA

DETECTION ORDER

| 1 | POS = A | ID = (NONSTEADY) | GR = (2 / 10 TIMES) |
|---|---|---|---|
| 2 | POS = D | ID = (SHUTTER SPEED) | GR = (1 / 3 SECONDS) |
| 3 | POS = E | ID = (SHUTTER SPEED) | GR = (1 SECOND) |

FIG. 9C

MERGED DEFECTIVE PIXEL DATA

MEMORY ADDRESS

| 0x0000 | POS = A | ID=(SHUTTER SPEED) | GR=(2 SECOND) |
|---|---|---|---|
| 0x0001 | POS = PREV | ID=(TEMPERATURE) | GR = (40 °C) |
| 0x0002 | POS = B | ID = (NONSTEADY) | GR = (3 / 10 TIMES) |
| 0x0003 | POS = C | ID = (SHUTTER SPEED) | GR = (1 / 5 SECONDS) |
| 0x0004 | POS = D | ID = (SHUTTER SPEED) | GR = (1 / 3 SECONDS) |
| 0x0005 | POS = E | ID = (SHUTTER SPEED) | GR = (1 SECOND) |

F I G. 11
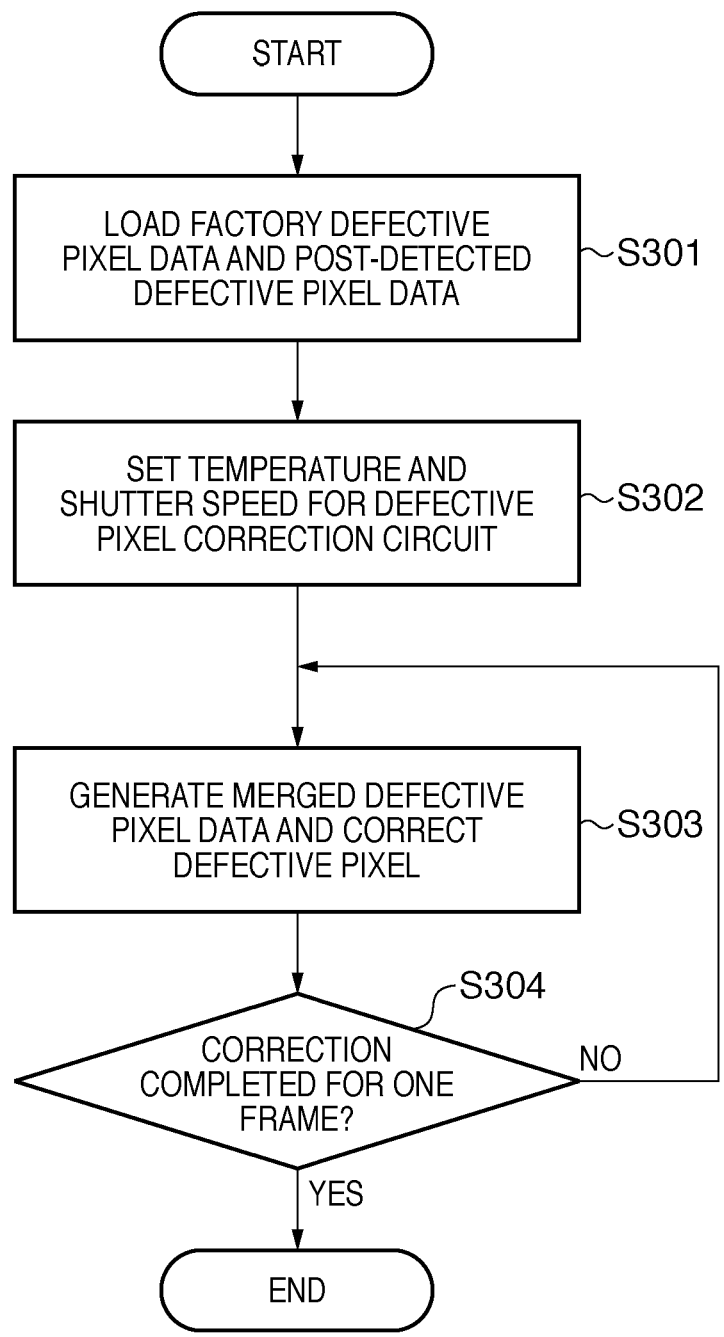

IMAGE PROCESSING APPARATUS AND METHOD HAVING DEFECTIVE PIXEL DETECTION AND CORRECTION ABILITY

BACKGROUND OF THE INVENTION

1. Field of the Invention

The present invention relates to an image processing apparatus and an image processing method, and more particularly, relates to a technique for correcting an image signal output from a defective pixel of an image sensor.

2. Description of the Related Art

In recent years, image sensors have been increased in number of pixels in electronic still cameras and video cameras, and with the increase in number of pixels, the importance of correcting image signals output from defective pixels in the image sensors increased. In this situation, a variety of techniques for correcting image degradation caused by defective pixels has been conventionally proposed. In many cases of the prior art, for example, as is proposed in Japanese Patent Laid-Open No. 2008-53886, defect correction for images is performed on the basis of defective pixel information (defective pixel positions and types of defect) on a image sensor retained at a factory.

However, the method as described above has a problem in that sufficient defect correction is not able to be applied, because the method fails to correct defects which are not detected under specific default check conditions in a factory and defects which are caused by aging.

Consequently, some techniques for solving this problem have been proposed. For example, Japanese Patent Laid-Open No. 2003-259221 proposes a technique of providing an image capturing apparatus with a defective pixel detection mode for detecting defective pixels of an image sensor to perform defect correction with the use of position data for defective pixels detected in the detection mode and position data for defective pixels stored in a memory.

However, in the prior art as disclosed in Japanese Patent Laid-Open No. 2003-259221, no special process is applied when the defective pixels detected in the detection mode include a defective pixel in the same position as that of a defective pixel stored in the memory. Therefore, when type information is retained in addition to positional information on defective pixels as in the case of Japanese Patent Laid-Open No. 2008-53886, multiple different pieces of type information may not have been able to be appropriately reflected, even if a defective pixel has multiple different types of defects. As a result, sufficient defect correction may not have been able to be applied for image signals output from the corresponding defective pixel with respect to various shooting conditions.

SUMMARY OF THE INVENTION

The present invention has been made in consideration of the above situation, and allows sufficient defect correction to be applied to image signals output from defective pixels.

According to the present invention, provided is an image processing apparatus for processing an image signal output from an image sensor including a plurality of pixels, the image processing apparatus comprising: a storage unit configured to store a first group of defective pixel data including positional information on a defective pixel of the image sensor and information on a type of defect; a detection unit configured to detect a defective pixel of the image sensor from an image signal output from the image sensor and generate a second group of defective pixel data including positional information on the detected defective pixel and information on a type of defect; a combining unit configured to combine the first group with the second group to generate a third group; and a correction unit configured to correct an image signal output from a defective pixel of the image sensor with the use of the third group, wherein the combining unit combines the first group and the second group into the third group by assigning a priority level corresponding to the type of defect to each piece of defective pixel data, and if there are multiple pieces of defective pixel data including positional information common to the first group and the second group, leaving the defective pixel data in the order of priority level, the highest the first and the lowest the last so that the number of types of defects corresponding to the common positional information is a predetermined number or less.

According to the present invention, provided is an image processing method for processing an image signal output from an image sensor including a plurality of pixels, the image processing method comprising the steps of: reading out a first group of defective pixel data including positional information on a defective pixel of the image sensor and information on a type of defect, the first group stored in a storage unit; detecting a defective pixel of the image sensor from an image signal output from the image sensor and generating a second group of defective pixel data including positional information on the detected defective pixel and information on a type of defect; combining the first group with the second group to generate a third group; and correcting an image signal output from a defective pixel of the image sensor with the use of the third group, wherein in the combining step, the first group and the second group are combined by assigning a priority level corresponding to the type of defect to each piece of defective pixel data, and if there are multiple pieces of defective pixel data including positional information common to the first group and the second group, leaving the defective pixel data in the order of priority level, the highest the first and the lowest the last so that the number of types of defects corresponding to the common positional information is a predetermined number or less.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a diagram showing an example of the format of defective pixel data in an embodiment of the present invention;

FIGS. 3A to 3C are diagrams for explaining an update process for defective pixel data in a first embodiment;

FIG. 4 is a flowchart for explaining an update process for defective pixel data;

FIGS. 6A to 6C are diagrams for explaining an update process for defective pixel data in a third embodiment;

FIGS. 7A to 7C are diagrams for explaining an update process for defective pixel data in a fourth embodiment;

FIGS. 8A to 8C are diagrams for explaining an update process for defective pixel data in the fourth embodiment;

FIGS. 9A to 9C are diagrams for explaining an update process for defective pixel data in a fifth embodiment;

FIG. 11 is a flowchart for explaining a defective pixel correction process in the sixth embodiment.

DESCRIPTION OF THE EMBODIMENTS

Exemplary embodiments of the present invention will be described in detail in accordance with the accompanying drawings.

<First Embodiment>

Figure 1:
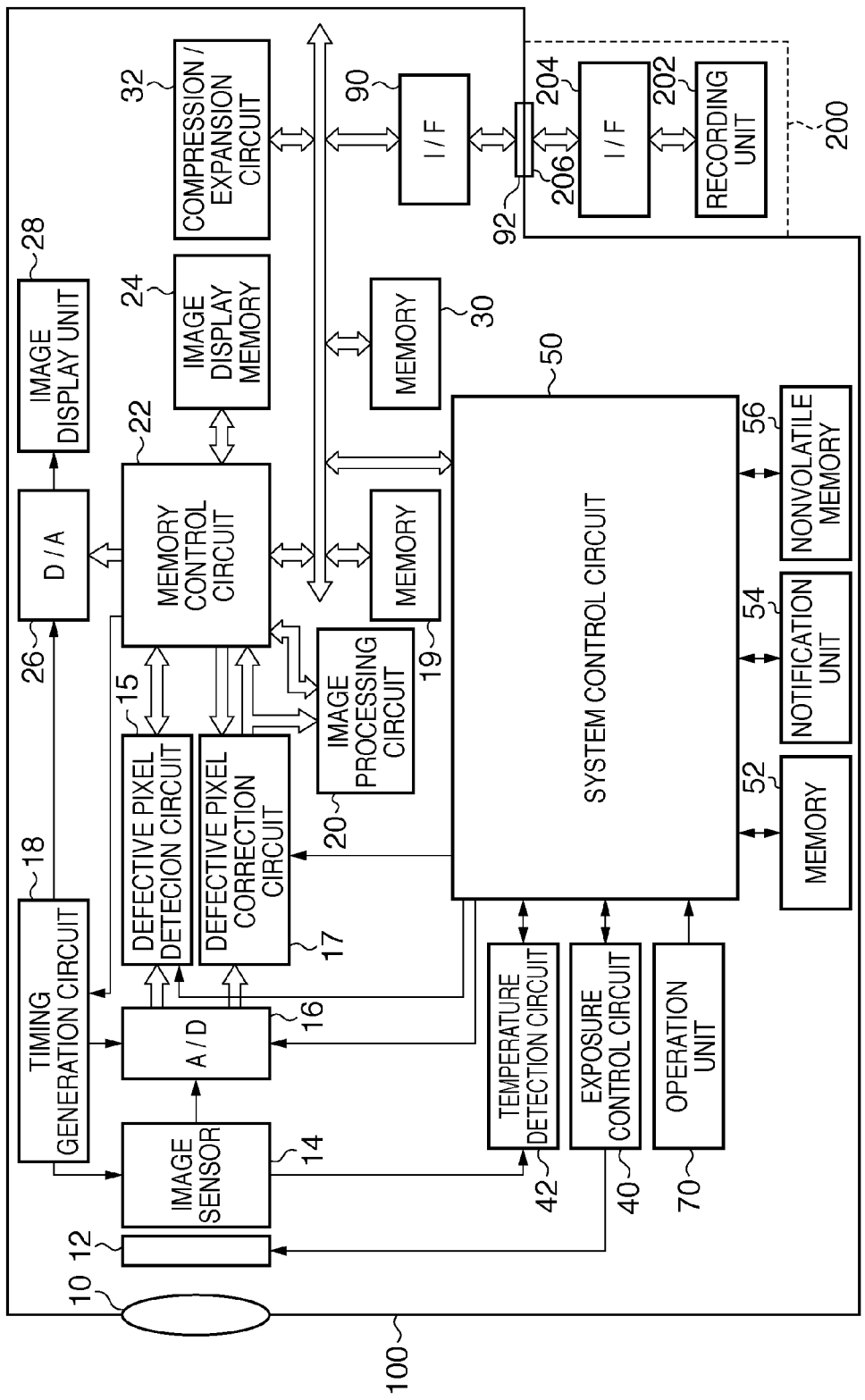
FIG. 1 is a block diagram illustrating the configuration of an image processing apparatus according to an embodiment of the present invention.

FIG. 1 is a block diagram illustrating schematically the configuration of an image processing apparatus according to a first embodiment of the present invention. It is to be noted that examples of the image processing apparatus include digital cameras, digital video cameras, portable terminals with cameras (including cellular phones with cameras), and scanners, and the present invention can be applied to the image processing apparatus as long as the image processing apparatus is capable of converting an optical image of a subject to output electrical image signals.

In FIG. 1, reference numeral 100 denotes an image processing apparatus. Reference numerals 10, 12, 14, and 16 respectively denotes an imaging lens, a shutter which also serves as a diaphragm, an image sensor for converting an optical image to electrical signals and an A/D converter for converting analog signal outputs of the image sensor 14 to digital signals. The image sensor 14 is a CCD, a MOS sensor, or the like, in which a plurality of pixels are two-dimensionally arranged.

Reference numeral 15 denotes a defective pixel detection circuit for detecting defective pixels from image signals output from the A/D converter 16 and updating defective pixel data. It is to be noted that an update process for defective pixel data, which is carried out in the defective pixel detection circuit 15, will be described in detail later with reference to FIGS. 3A to 3C and FIG. 4. Reference numeral 17 denotes a defective pixel correction circuit which inputs image signals output from the A/D converter 16 and corrects image signal degradation caused by defective pixels. It is to be noted that a defective pixel correction process which is carried out in the defective pixel correction circuit 17 will be described later.

Reference numeral 18 denotes a timing generation circuit for supplying a clock signal and a control signal to each of the image sensor 14, the A/D converter 16, and a D/A converter 26, which is controlled by a memory control circuit 22 and a system control circuit 50.

Reference numeral 19 denotes a memory for holding information on defective pixels, and reference numeral 20 denotes an image processing circuit, which applies predetermined pixel interpolation processing or color conversion processing to data from the defective pixel correction circuit 17 or data from the memory control circuit 22.

Reference numeral 22 denotes the memory control circuit, which controls the A/D converter 16, the defective pixel correction circuit 17, the timing generation circuit 18, the memory 19, the image processing circuit 20, an image display memory 24, the D/A converter 26, a memory 30, and a compression/expansion circuit 32. Image data output from the defective pixel correction circuit 17 is transmitted through the image processing circuit 20 and the memory control circuit 22, or only through the memory control circuit 22, and written in the image display memory 24 or the memory 30.

Reference numeral 24 denotes an image display memory, reference numeral 26 denotes the D/A converter, and reference numeral 28 denotes an image display unit composed of a TFT-LCD, etc., and image data for display, written into the image display memory 24, is displayed by the image display unit 28 through the D/A converter 26. The use of the image display unit 28 for sequentially displaying captured image data allows an electronic viewfinder (EVF) function to be achieved.

Reference numeral 30 denotes a memory for storing shot still images and moving images, which has a storage capacity sufficient to store a predetermined number of still images and moving images for a predetermined period of time. In addition, it is also possible to use the memory 30 as a working area of the system control circuit 50.

Reference numeral 32 denotes the compression/expansion circuit for compressing or expanding image data with the use of a known compression method such as adaptive discrete cosine transform (ADCT). The compression/expansion circuit 32 reads an image stored in the memory 30 to apply compression processing or expansion processing to the image, and writes the processed data again into the memory 30.

Reference numeral 40 denotes an exposure control circuit, which controls the shutter 12 which serves as a diaphragm. The exposure control circuit 40 is controlled with the use of a TTL (Through The Lens) system, in such a way that the system control circuit 50 controls the exposure control circuit 40 on the basis of the result of calculation for captured image data, which is performed by the image processing circuit 20.

Reference numeral 42 denotes a temperature detection circuit for detecting the temperature of the image sensor 14 with the use of a temperature sensor, reference numeral 50 denotes the system control circuit for generally controlling the image processing apparatus 100, and reference numeral 52 denotes a memory for storing constants, variables, programs, etc. for operation of 1the system control circuit 50.

Reference numeral 54 denotes a notification unit for externally notifying operating conditions and messages with the use of characters, images, sounds, etc., depending on the execution of a program in the system control circuit 50. As the notification unit 54, for example, a display unit for carrying out visual displays, such as a LCD and a LED, a sound element for issuing notices with the use of sounds, etc. may be used, and the notification unit 54 is composed of a combination of one or more of these units and elements. In particular, in the case of using the display unit, the display unit is placed in single or multiple locations easily recognized visually, around an operation unit 70 of the image processing apparatus 100.

Reference numeral 56 denotes an electrically erasable and recordable nonvolatile memory, and for example, an EEPROM, etc. may be used for the nonvolatile memory 56. The nonvolatile memory 56 stores defective pixel data of the image sensor 14.

Reference numeral 70 denotes an operation unit composed of various types of buttons, a touch panel, etc., reference numeral 90 denotes an interface with a recording medium such as a memory card or a hard disk, and reference numeral 92 denotes a connecter for connecting to a recording medium such as a memory card or a hard disk.

Reference numeral 200 denotes a recording medium such as a memory card or a hard disk. The recording medium 200 includes a recording unit 202 including a semiconductor memory, a magnetic disk, etc., an interface 204 with the image processing apparatus 100, and a connecter 206 for connecting to the image processing apparatus 100.

FIG. 2 is a diagram for explaining the format of defective pixel data in the present embodiment. Data for one memory address (for one row) in FIG. 2 correspond to one word of defective pixel data, and in the present embodiment, one word refers to data for one type of defect in one defective pixel, and has a bit length of 32 bits. In addition, the defective pixel data is stored in the memory in the order of reading out the pixels from the image sensor 14. Furthermore, one word of the defective pixel data is composed of the position of defective pixel (POS), the type of defect (ID), and the degree of defect (GR).

The data "A" or "D" listed as the "POS" in FIG. 2 refers to data indicating the two-dimensional position of a defective pixel, and in the present embodiment, is supposed to have data in a format such as A=(2,3) or D=(4,5), for example, in two-dimensional coordinates with an X coordinate of 14 bits and a Y coordinate of 14 bits. In addition, the positions of the defective pixels are supposed to be arranged in a manner of A, B, C, . . . with respect to the order of reading out the pixels of the image sensor 14. Furthermore, the value "PREV" of the "POS" indicates that the associated data "ID" or "GR" refers to data in the same position as that of the defective pixel data for the previous memory address, and data assigned to "PREV" is data which is not assigned to the two-dimensional coordinates for the position of defective pixel. For example, the value PREV=(16383,16383) is adopted, which is not assigned to the defective pixel position data.

For the data "ID", a code is set which corresponds to the type of defect for each defective pixel (for example, a shutter speed dependence defect, a temperature dependence defect, a nonsteady defect, or a continuous defect). For example, 2-bit codes, such as (shutter speed)=00, (temperature)=01, (nonsteady)=10, and (continuous)=11, are assigned in advance to set the ID for each defective pixel. The shutter speed dependence defect refers to a defective pixel whose output reaches a level requiring correction when the shutter speed has a predetermined period of time or faster. The temperature dependence defect refers to a defective pixel whose output reaches a level requiring correction when the image sensor 14 has a predetermined temperature or more. The nonsteady defect refers to a defective pixel whose output reaches a level requiring correction with a certain period when frame images are continuously read out. The continuous defect refers to multiple continuous pixels whose outputs reach a level requiring correction.

For the data "GR", the parameter for the type of each defective pixel is used to set the threshold value at which a defect is caused. For example, the shutter speed at which a defect is caused is assigned to the data "GR" of shutter speed dependence defect in advance using 2-bit parameters such as (⅕ seconds)=00, (⅓ seconds)=01, (1 second)=10, and (2 seconds)=11. In addition, for example, the temperature of the image sensor 14 at which a defect is caused is assigned to the data "GR" of temperature dependence defect in advance using 2-bit parameters such as (30° C.)=00, (40° C.)=01, (50° C.)=10, and (60° C.)=11. In addition, for example, the frequency of frame image in which the pixel in the corresponding position is defective when frame images are read out continuously from the image sensor 14 is set for the data "GR" of nonsteady defect in advance using 2-bit parameters such as (5/10 times)=00, (4/10 times)=01, (3/10 times)=10, and (2/10 times)=11. Further, for example, the number of continuous defective pixels from the corresponding pixel is assigned to the data "GR" of continuous defect in advance using 2-bit parameters such as (5 continuous pixels)=00, (4 continuous pixels)=01, (3 continuous pixels)=10, and (2 continuous pixels)=11. With regard to the same type of defective pixel, the degree of defect of pixel indicated by the two-bit parameter 00 is the worst, and the degree of defect of pixel indicated by the two-bit parameter 11 is the slightest.

While parameters such as "POS", "ID", and "GR" are assigned for each type of defective pixel to determine the value of each parameter as described above in the present embodiment, the present invention is not to be considered limited to this embodiment. Other methods may be employed to determine the value of each parameter, or parameters other than the parameters described above may be assigned.

FIGS. 3A to 3C are diagrams for explaining an update process for defective pixel data in the first embodiment, which is carried out in the defective pixel detection circuit 15. FIG. 3A shows factory defective pixel data (first group) indicating defective pixel information on an image sensor at the time of shipment from a factory, which is held in the nonvolatile memory 56, loaded into the memory 19, and updated as will be described later. FIG. 3B shows post-detected defective pixel data (second group), which refers to defective pixel data detected by the defective pixel detection circuit 15, from pixel output data of the image sensor 14, which is output from the A/D converter 16 after factory shipment. The defective pixel detection can be carried out, for example, with the use of a technique as disclosed in Japanese Patent Laid-Open No. 2005-136970. More specifically, in the case of a temperature dependence defect or a shutter speed dependence defect, the differential signal between an image signal and the image signal undergone an appropriate filtering process is calculated to determine if the pixel is a defective pixel or a normal pixel depending on the magnitude of the differential signal. Then, if the pixel is a defective pixel, the degree of defect is determined, and the determination result is associated with positional information on the detected pixel. In addition, depending on the detection result from the temperature detection circuit 42 and shooting conditions such as the shutter speed from the exposure control circuit 40 at the time of determination of the defective pixel, the type of defect such as a temperature dependence defect or a shutter speed dependence defect is determined, and the determination result is associated with the positional information on the defective pixel and degree information on the defective pixel to generate defective pixel data. In the case of a nonsteady defect, it is determined if the pixel is a defective pixel or a normal pixel, depending on the magnitude of a differential signal between multiple frames, and the degree of defect is assigned depending on the number of times that the pixel is determined as the defective pixel. In the case of a continuous defect, it is determined if a pixel is a defective pixel or a normal pixel, depending on the magnitude of a differential signal, and the degree of defect is assigned depending on the number of continuous defective pixels.

Then, the defective pixel detection circuit 15 combines the factory defective pixel data with the post-detected defective pixel data to generate merged defective pixel data (third group). In the first embodiment, the number (predetermined number) of defect types which can be overlapped in the position of one defective pixel is determined in advance, and in the case of exceeding the number, the type of defect with the highest priority level determined in advance is first selected, whereas the type of defect with the lowest priority level is removed. For example, the upper limit of the number of defect types is set to "2", and the priority levels for the types of defect are determined in advance, such as (shutter speed)> (temperature)>(nonsteady) >(continuous).

In FIGS. 3A and 3B, both of the factory defective pixel data and the post-detected defective pixel data include defective pixel data for a defective pixel in the position of "POS=A". In this case, in order not to exceed the upper limit 2 for the number of defect types, that is, in order to result in the predetermined number or less, the defective pixel data for the type of defect with a lower priority level is not subjected to data combination. In this case, among the shutter speed dependence defect and temperature dependence defect shown in FIG. 3A and the nonsteady defect shown in FIG. 3B, the nonsteady defect has the lowest priority level, and the data for the nonsteady defect is thus not included in the merged defective pixel data. In addition, if the same type of defects are present in the defective pixel position common to the factory defective pixel data and the post-detected defective pixel data, the defective pixel data with the higher degree of defect is selected, for example, with the use of a technique as disclosed in Japanese Patent Laid-Open No. 2005-136970. The other post-detected defective pixel data, (POS=D) and (POS=E), shown in FIG. 3B is different from the data shown in FIG. 3A in defect pixel position, and thus combined in the order of reading the image sensor 14. This combination generates the merged defective pixel data shown in FIG. 3C.

FIG. 4 is a flowchart for explaining an update process for defective pixel data in the first embodiment.

First, the factory defective pixel data is loaded from the nonvolatile memory 56 into the memory 19 (step S1). Next, information such as the temperature of the image sensor 14 detected by the temperature detection circuit 42 and the shutter speed from the exposure control circuit 40, which is information required for the detection of defective pixels, is set for the defective pixel detection circuit 15 (step S2). After that, the image sensor 14 and the A/D converter 16 are operated to input image signals for defective pixel detection to the defective pixel detection circuit 15, and the factory defective pixel data loaded in advance in the memory 19 is input through the memory control circuit 22 to the defective pixel detection circuit 15. Then, the defective pixel detection circuit 15 detects defective pixels sequentially from the input image data for defective pixel detection to generate post-detected defective pixel data (step S3). When the readout of the image data for detection is completed for one frame (step S4), the defective pixel detection circuit 15 combines the factory defective pixel data with the post-detected defective pixel data in the way as described with reference to FIGS. 3A to 3C to generate merged defective pixel data. Then, the generated merged defective pixel data is stored in the memory 19 via the memory control circuit 22. Then, the merged defective pixel data stored in the memory 19 is overwritten and saved in the nonvolatile memory 56 as factory defective pixel data (step S5).

Figure 5:
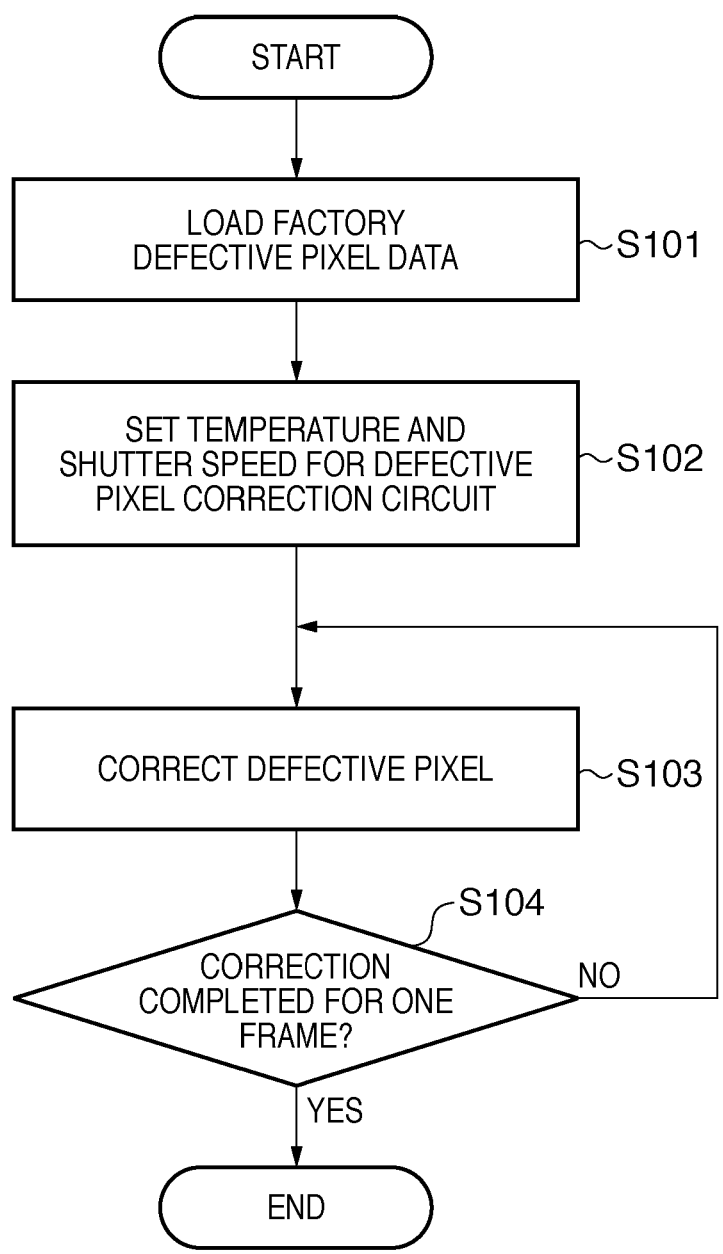
FIG. 5 is a flowchart for explaining a defective pixel correction process.

FIG. 5 is a flowchart for explaining a defective pixel correction process in the first embodiment.

First, the factory defective pixel data (merged defective pixel data) is loaded from the nonvolatile memory 56 into the memory 19 (step S101). In addition, information such as the temperature of the image sensor 14 detected by the temperature detection circuit 42 and the shutter speed from the exposure control circuit 40, which is information required for defective pixel correction, is set for the defective pixel correction circuit 17 (step S102). Next, image signals obtained by operating the image sensor 14 and the A/D converter 16 are input to the defective pixel correction circuit 17. Additionally, the factory defective pixel data (merged defective pixel data) loaded in advance in the memory 19 is input to the defective pixel correction circuit 17 via the memory control circuit 22. The defective pixel correction circuit 17 specifies the position of a defective pixel from positional information of the defective pixel data to correct the image signal from the defective pixel among the input image signals. The correction in this case is carried out, for example, by linear interpolation from image data output from normal pixels around the defective pixel (step S103). Then, when the readout of the image is completed for one frame, the defective pixel correction process is ended (step S104).

It is to be noted that while the number of defect types which can be overlapped in the position of one defective pixel is determined in advance so that control is exercised so as not to exceed the upper limit in the first embodiment, the upper limit of the number may be adequately increased to allow for data addition substantially without any upper limit.

As described above, according to the first embodiment, when it is desirable to apply the predetermined priority levels for the types of defect as priority levels for selection, defect correction can be applied to a sufficient number of types of defect with respect to the position of one defective pixel, thereby allowing an image processing apparatus to be provided with insufficient correction or excess correction reduced with respect to various shooting conditions. In addition, the memory capacity of the nonvolatile memory 56 can be reduced, because the post-detected defective pixel data is combined with the factory defective pixel data.

<Second Embodiment>

Next, a second embodiment of the present invention will be described. The second embodiment is different from the first embodiment described above in that generation of merged defective pixel data is limited by combinations of types of defect which are not allowed to be held in the same defective pixel position. The other is the same as in the first embodiment, and a process for generating merged defective pixel data in the second embodiment will be thus described below with reference to FIGS. 3A to 3C.

In the second embodiment, the upper limit for the number of types of defect which can be held in the same defective pixel position is assumed to be "2", and for example, the (nonsteady) defect and the other type of defect are not allowed to be held as defective pixel data for the same pixel position. In addition, the priority levels for the types of defect are assumed to be (shutter speed)>(temperature)>(nonsteady)>(continuous).

In FIGS. 3A and 3B, both of the factory defective pixel data and the post-detected defective pixel data include defective pixel data for a defective pixel in the position of "POS=A". Thus, in order not to exceed the upper limit 2 for the number of defect types, the defective pixel data for the type of defect with a lower priority level is not subjected to data combination. In this case, the nonsteady defect shown in FIG. 3B is not allowed to be held with any type of defect, and also has the lowest priority level. Thus, the defective pixel data for the nonsteady defect is not included in the merged defective pixel data. The other combining process for defective pixel data is the same as in the first embodiment described above, and the description of the process will be omitted here.

As described above, according to the second embodiment, when it is desirable to select types of defect by prohibiting a specific combination with regard to types of defect and assigning priority levels in advance to types of defect, a sufficient number of types of defect can be corrected with respect to one defective pixel position, thereby allowing an image processing apparatus to be provided with insufficient correction or excess correction reduced with respect to various shooting conditions. In addition, the memory capacity of the nonvolatile memory 56 can be reduced, because the post-detected defective pixel data is combined with the factory defective pixel data.

<Third Embodiment>

Next, a third embodiment of the present invention will be described. In the third embodiment, the priority level used in generating merged defective pixel data is different from those in the first and second embodiments described above. The other is the same as in the first embodiment, and a process for generating merged defective pixel data in the third embodiment will be thus described below with reference to FIGS. 6A to 6C.

FIGS. 6A to 6C are diagrams for explaining an update process for defective pixel data in the third embodiment, which is carried out in the defective pixel detection circuit 15. FIG. 6A shows factory defective pixel data (first group) indicating defective pixel information on an image sensor at the time of shipment from a factory, whereas FIG. 6B shows post-detected defective pixel data (second group) detected by the defective pixel detection circuit 15.

In the third embodiment, the upper limit for the number of types of detect which can be held in the same defective pixel position is assumed to be "2", and multiple different types of defect for the same defective pixel position will be held in the order of detecting the defects. Then, if the number of types of defect exceeds the upper limit, the type of defect with the largest memory address, that is, the type of defect with latest detection time is first selected, whereas the type of defect with the smallest memory address, that is, the type of defect with oldest detection time is first removed.

In FIGS. 6A and 6B, both of the factory defective pixel data and the post-detected defective pixel data include defective pixel data for a defective pixel in the position of "POS=A". Thus, in order not to exceed the upper limit 2 for the number of defect types, the defective pixel data for the type of defect with a lower priority level is not subjected to data combination. In this case, the shutter speed dependence defect shown in FIG. 6A has the oldest detection time, which is saved in the smallest memory address, and thus have the lowest priority level. Therefore, the data for the shutter speed dependence defect is thus not included in merged defective pixel data (third group) as shown in FIG. 6C. The other combining process for defective pixel data is the same as in the first embodiment described above, and the description of the process will be omitted here.

As described above, according to the third embodiment, when it is desirable to apply the detection time as a priority level, a sufficient number of types of defect can be corrected with respect to one defective pixel position, thereby allowing an image processing apparatus to be provided with insufficient correction or excess correction reduced with respect to various shooting conditions. In addition, the memory capacity of the nonvolatile memory 56 can be reduced, because the post-detected defective pixel data is combined in advance with the factory defective pixel data.

<Fourth Embodiment>

Next, a fourth embodiment of the present invention will be described. In the fourth embodiment, the priority level used in generating merged defective pixel data is different from those in the first to third embodiments described above. The other is the same as in the first embodiment, and a process for generating merged defective pixel data in the fourth embodiment will be thus described below with reference to FIGS. 7A to 7C and FIGS. 8A to 8C.

FIGS. 7A to 7C are diagrams for explaining an update process for defective pixel data in the fourth embodiment, which is carried out in the defective pixel detection circuit 15. FIG. 7A shows factory defective pixel data (first group) indicating defective pixel information on an image sensor at the time of shipment from a factory, whereas FIG. 7B shows post-detected defective pixel data (second group) detected by the defective pixel detection circuit 15.

In the fourth embodiment, the upper limit for the number of types of defect which can be held in the same defective pixel position is assumed to be "3", and a higher priority level is assigned to a type of defect detected at a higher frequency. Therefore, for example, multiple different types of defect for the same defective pixel position are held in accordance with frequency of detection. Then, if the number of types of defect exceeds the upper limit, the type of defect with the largest memory address, that is, the type of defect with highest frequency of detection is first selected, whereas the type of defect with the smallest memory address, that is, the type of defect with lowest frequency of detection is first removed.

In FIGS. 7A and 7B, both of the factory defective pixel data and the post-detected defective pixel data include defective pixel data for a defective pixel in the position of "POS=A" with a type of defect of "ID=(shutter speed)". In the fourth embodiment, as has been proposed conventionally, the type of defect with a higher degree of defect is selected, and the memory addresses for the data are then also interchanged in accordance with the frequency of detection. In this case, the data "one second" in FIG. 7B with a higher degree of defect is selected for the "GR" of the type of defect "ID=(shutter speed)", and furthermore, the priority level for the type of defect "ID=(shutter speed)" is increased by one level, more specifically, the memory address for the type of defect "ID=(shutter speed)" is decreased by one address, because the frequency of detection for the type of defect "ID=(shutter speed)" is increased. Therefore, as shown in FIG. 7C, the type of defect "ID=(temperature)" which used to have a higher frequency of detection than the type of defect "ID=(shutter speed)" has a priority level decreased by one level, and has a memory address decreased by one address.

FIGS. 8A to 8C are diagrams for explaining the operation of using the merged defective pixel data in FIG. 7C as new factory defective pixel data and further merging detected post-detected defective pixel data. Both of the factory defective pixel data (first group) shown in FIG. 8A and the post-detected defective pixel data shown in FIG. 8B include defective pixel data (second group) for a defective pixel in the position of "POS=A". In this case, in order not to exceed the upper limit 3 for the number of defect types, the defective pixel data for the type of defect with a lower priority level is not subjected to data combination. In addition, in the fourth embodiment, the frequency of detection is assumed to be 100% for a first appearing continuous defect to obtain the highest priority level. In this case, the temperature dependence defect has the lowest merged frequency, which is located in the smallest memory address, and thus has the lowest priority level. Thus, the defective pixel data for the temperature dependence defect is removed from the merged defective pixel data. This merge generates merged defective pixel data (third group) as shown in FIG. 8C. While the frequency of detection is not counted for each type of defect as described above, the defective pixel data for the type of defect with a higher frequency of detection has more opportunities for increase in memory address, and thus has fewer opportunities to be removed from the merged defective pixel data.

It is to be noted that while the frequency of detection is controlled in accordance with the order of storage in the memory in the fourth embodiment, the present invention is not to be considered limited to this embodiment, and for example, the value of the frequency of detection may be counted for each type of defect, and separately held for control in a memory in association with the type of defect.

As described above, according to the fourth embodiment, when it is desirable to apply the frequency of detection as the priority level for selection, a sufficient number of types of defect can be corrected with respect to one defective pixel position, thereby allowing an image processing apparatus to be provided with insufficient correction or excess correction reduced with respect to various shooting conditions. In addition, the memory capacity of the nonvolatile memory 56 can be reduced, because the post-detected defective pixel data is combined in advance with the factory defective pixel data.

<Fifth Embodiment>

Next, a fifth embodiment of the present invention will be described. In the fifth embodiment, the priority level used in generating merged defective pixel data is different from those in the first to fourth embodiments described above. The other is the same as in the first embodiment, and a process for generating merged defective pixel data in the fifth embodiment will be thus described below with reference to FIGS. 9A to 9C.

FIGS. 9A to 9C are diagrams for explaining an update process for defective pixel data in the fifth embodiment, which is carried out in the defective pixel detection circuit 15. FIG. 9A shows factory defective pixel data (first group) indicating defective pixel information on an image sensor at the time of shipment from a factory, whereas FIG. 9B shows post-detected defective pixel data (second group) detected by the defective pixel detection circuit 15.

In the fifth embodiment, the upper limit for the number of types of defect which can be held in the same defective pixel position is assumed to be "2", and priority levels are assigned in such a way that converted degrees of defect of pixel are compared so as to allow the comparison between different types of defect. In the fifth embodiment, the conversion factor is assumed to be a multiplier coefficient multiplied by the degree of defect.

In FIGS. 9A and 9B, both of the factory defective pixel data and the post-detected defective pixel data include defective pixel data for a defective pixel in the position of "POS=A". Thus, in order not to exceed the upper limit 2 for the number of defect types, the defective pixel data for the type of defect with a lower priority level is removed from the list of data combination. The conversion factor is set as, for example, (shutter speed)=2, (temperature)=2, (nonsteady)=1, and (continuous)=1 for each type of defect. Further, in the fifth embodiment, a degree coefficient of defect is assigned to each of the two-bit parameters which indicate the degree of defect of pixel in the first embodiment, the degree coefficient increases as the degree of defect of pixel becomes worse. Here, the degree coefficient of defect corresponding to the two-bit parameter 00 is set to 4, the degree coefficient of defect corresponding to the two-bit parameter 01 is set to 3, the degree coefficient of defect corresponding to the two-bit parameter 10 is set to 2, and the degree coefficient of defect corresponding to the two-bit parameter 11 is set to 1. The degree coefficient of defect indicated by the data "GR=(2 seconds)" of "POS=A, ID=(shutter speed)" shown in FIG. 9A refers to the degree coefficient 1 as described in the first embodiment, and the converted degree of defect in this case thus results in 2 (=1×2). Likewise, the degree coefficient of defect indicated by the data "GR=(40° C.)" of "POS=A, ID=(temperature)" refers to the degree coefficient 3, the converted degree of defect in this case thus results in 6 (=3×2). In addition, the degree coefficient of defect indicated by the data "GR=(2/10 times)" of "POS=A, ID=(nonsteady)" refers to the degree coefficient 1, the converted degree of defect in this case thus results in 1 (=1×1). Among these, priority levels are assigned in such a way that the highest priority level is assigned to the highest converted degree of defect, and the type of defect with the highest priority level is first selected, whereas the type of defect with the lowest priority level is first removed. In the example shown in FIGS. 9A to 9C, the data of "POS=A, ID=(nonsteady)" with the best degree for defective pixel is removed from merged defective pixel data (third group).

According to the fifth embodiment, when it is desirable to apply the degree of defect as the priority level for selection, a sufficient number of types of defect can be corrected with respect to one defective pixel position, thereby allowing an image processing apparatus to be provided with insufficient correction or excess correction reduced with respect to various shooting conditions. In addition, the memory capacity of the nonvolatile memory 56 can be reduced, because the post-detected defective pixel data is merged in advance with the factory defective pixel data.

<Sixth Embodiment22

Next, a sixth embodiment of the present invention will be described. In the sixth embodiment, the timing of generating merged defective pixel data is different from the timing described in the first embodiment. The other is the same as in the first to fifth embodiments, and a process for generating merged defective pixel data and defective pixel correction process in the sixth embodiment will be thus described below with reference to FIGS. 10 and 11.

Figure 10:
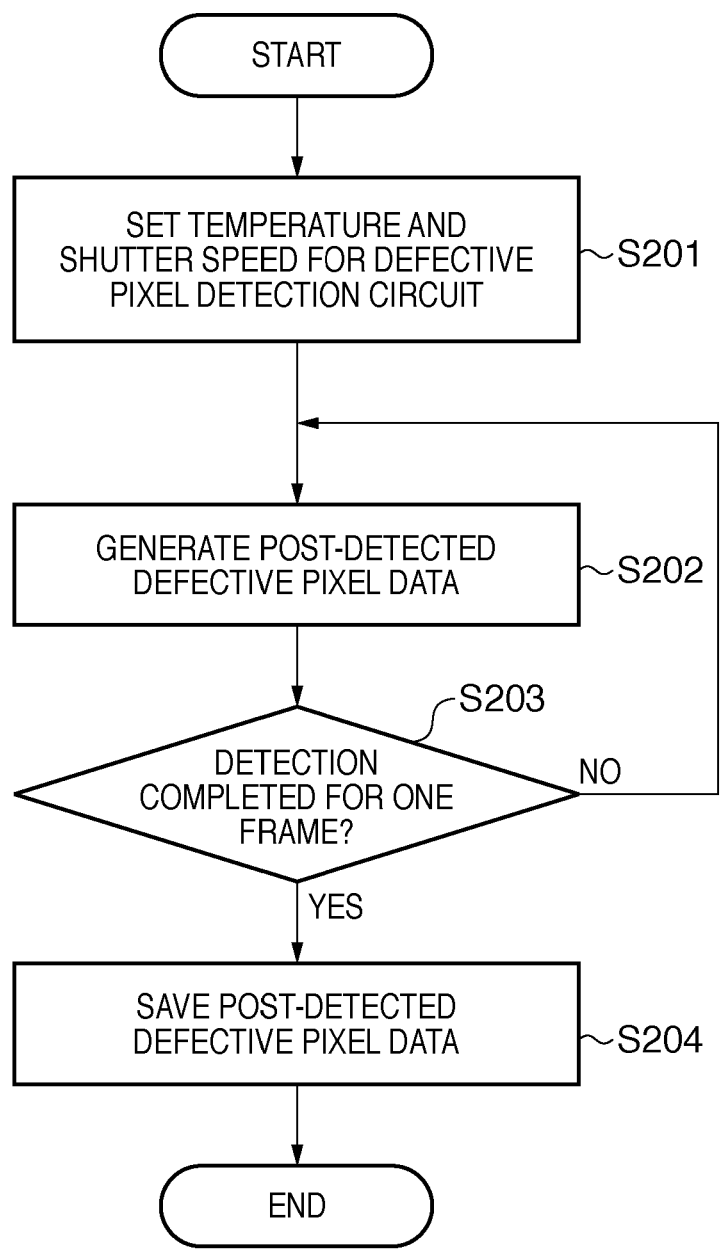
FIG. 10 is a flowchart for explaining a process for detecting and recording post-detected defective pixel data in a sixth embodiment.

FIG. 10 is a flowchart for explaining a process for detecting and recording post-detected defective pixel data in the sixth embodiment.

First, information such as the temperature of the image sensor 14 detected by the temperature detection circuit 42 and the shutter speed from the exposure control circuit 40, which is information required for defective pixel correction, is set for the defective pixel detection circuit 15 (step S201). After that, the image sensor 14 and the A/D converter 16 are operated to input image signals for defective pixel detection to the defective pixel detection circuit 15. The defective pixel detection circuit 15 detects defective pixels sequentially from the input image data for defective pixel detection to generate post-detected defective pixel data (second group) (step S202). When the readout of the image data for detection is completed for one frame (step S203), the generated post-detected defective pixel data is stored in the memory 19 via the memory control circuit 22, and furthermore, saved additionally in an area of the nonvolatile memory 56 separately from factory defective pixel data (step S204).

FIG. 11 is a flowchart for explaining a defective pixel correction process in the sixth embodiment.

First, factory defective pixel data and post-detected defective pixel data are loaded from the nonvolatile memory 56 into the memory 19 (step S301). In addition, information such as the temperature of the image sensor 14 detected by the temperature detection circuit 42 and the shutter speed from the exposure control circuit 40, which is information required for defective pixel correction, is set for the defective pixel correction circuit 17 (step S302). Next, image signals obtained by operating the image sensor 14 and the A/D converter 16 are input to the defective pixel correction circuit 17. Additionally, the factory defective pixel data (first group) and post-detected defective pixel data loaded in advance in the memory 19 are input to the defective pixel correction circuit 17 via the memory control circuit (step S303). In this step, the factory defective pixel data and post-detected defective pixel data are combined to generate merged defective pixel data (third group) in accordance with the method described above in the first to fifth embodiments, so that the number of types of defect is sufficient for the same pixel position to be corrected.

Then, when the readout of the image is completed for one frame (step S304), the defective pixel correction process is ended.

As described above, according to the sixth embodiment, a sufficient number of types of defect can be corrected with respect to one defective pixel position, thereby allowing an image processing apparatus to be provided with insufficient correction or excess correction reduced with respect to various shooting conditions. In addition, the factory defective pixel data stored in advance in the nonvolatile memory 56 can be held without any modification, because the post-detected defective pixel data is held separately from the factory defective pixel data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-291402, filed on Dec. 22, 2009 which is hereby incorporated by reference herein in its entirety.

What is claimed is:

1. An image processing apparatus for processing an image signal output from an image sensor including a plurality of pixels, the image processing apparatus comprising:
   a storage unit configured to store a first group of defective pixel data including positional information on a defective pixel of the image sensor, information on a type of defect, and information on a degree of the defect for each defective pixel;
   a detection unit configured to detect a defective pixel of the image sensor from an image signal output from the image sensor and generate a second group of defective pixel data including positional information on the detected defective pixel, information on a type of defect, and information on a degree of the defect for the detected defective pixel;
   a combining unit configured to combine the first group with the second group to generate a third group of defective pixel data; and
   a correction unit configured to correct an image signal output from a defective pixel of the image sensor with the use of the third group,
   wherein the combining unit combines the first group and the second group into the third group by assigning a priority level corresponding to the type of defect to each piece of defective pixel data, and if there are multiple pieces of defective pixel data of different types of defects including positional information common to the first group and the second group, leaving the defective pixel data in the order of priority level, the highest the first and the lowest the last so that the number of types of defects corresponding to the common positional information is a predetermined number, that is two or more, or less.

2. The image processing apparatus according to claim 1, wherein the combining unit assigns priority levels to degrees of defect for the defective pixel data, in such a way that a higher priority level is assigned to a higher degree of defect.

3. The image processing apparatus according to claim 1, wherein if the types of defect corresponding to the common positional information coincide with a predetermined combination of types of defect, the combining unit does not leave, in the third group, the defective pixel data including the type of defect with the lower priority level, regardless of the predetermined number.

4. The image processing apparatus according to claim 1, wherein the combining unit assigns priority levels to times of detecting the defective pixel data, in such a way that a higher priority level is assigned to a later time of detecting.

5. The image processing apparatus according to claim 1, wherein the combining unit assigns priority levels to frequencies of detection of types of defect for the defective pixel data, in such a way that a higher priority level is assigned to a higher frequency of detection.

6. The image processing apparatus according to claim 2, wherein the combining unit further assigns priority levels to degrees of defect for the defective pixel data in such a way that a higher priority level is assigned to a higher degree of defect, and leaves the defective pixel data by a priority level, highest the first and the lowest the last, represented by the products of priority levels for the degrees of defect and priority levels for the types of defect to combine the first group and the second group.

7. The image processing apparatus according to claim 1, wherein the combining unit generates the third group following generation of the second group by the detection unit.

8. The image processing apparatus according to claim 1, wherein the combining unit generates the third group at the time of the correction unit carrying out the correction.

9. An image processing method for processing an image signal output from an image sensor including a plurality of pixels, the image processing method comprising the steps of:
   reading out a first group of defective pixel data including positional information on a defective pixel of the image sensor, information on a type of defect, and information on a degree of the defect for each defective pixel, the first group stored in a storage unit;
   detecting a defective pixel of the image sensor from an image signal output from the image sensor and generating a second group of defective pixel data including positional information on the detected defective pixel, information on a type of defect, and information on a degree of the defect for the detected defective pixel;
   combining the first group with the second group to generate a third group of defective pixel data; and
   correcting an image signal output from a defective pixel of the image sensor with the use of the third group,
   wherein in the combining step, the first group and the second group are combined by assigning a priority level corresponding to the type of defect to each piece of defective pixel data, and if there are multiple pieces of defective pixel data of different types including positional information common to the first group and the second group, leaving the defective pixel data in the order of priority level, the highest the first and the lowest the last so that the number of types of defects corresponding to the common positional information is a predetermined number, that is two or more, or less.

* * * * *